United States Patent Office.

JOHN F. WOLFF, OF CHICAGO, ILLINOIS, ASSIGNOR OF ONE-HALF OF HIS RIGHT TO JACOB W. MOWER, OF SAME PLACE.

PROCESS OF MANUFACTURING GLUCOSE.

SPECIFICATION forming part of Letters Patent No. 226,434, dated April 13, 1880.

Application filed January 12, 1880.

*To all whom it may concern:*

Be it known that I, JOHN FERDINAND WOLFF, of Chicago, in the county of Cook and State of Illinois, have invented certain new and useful Improvements in Processes of Manufacturing Glucose, of which the following is a specification.

Hitherto in all processes for manufacturing glucose direct from corn or other starch-containing substance there has always been great danger of coloring or burning the mass both in the operations of mashing and boiling with acid, as each operation required a long period of time. There has also been a tendency to decompose or sour during warm weather. It has also been impossible to secure a complete conversion.

The object of my invention is to obviate these defects, shortening the time of mashing and boiling, so as to lessen the danger of coloring or burning the material, overcoming the tendency to decompose or sour by a more perfect working of the material, and securing the conversion of a larger percentage of the material.

To accomplish this, my invention consists in introducing into one or more, or preferably all, the steps of mashing, boiling, and neutralizing, currents of oxygen, which at present can most readily and cheaply be done by forcing currents of air through the mass.

To enable others skilled in the art to use and practice my invention, I will now proceed to describe the manner of using it, taking as a basis the ordinary method of manufacturing glucose, but noting particularly the times and quantities best suited to my process.

The corn, (or other starch-containing substance,) having first been reduced by milling to the finest possible flour, is mashed by adding slowly to it three times its weight of water, which is thoroughly incorporated with it by stirring. The mixture is then heated slowly up to 60° Fahrenheit, at about which heat it is retained for from ten (10) to twelve (12) hours, the mass being all the time agitated by stirrers, and a current of air being constantly supplied to the center of the bottom of the mass by means of a rotary air-pump or blower and a pipe leading therefrom to the center of the bottom of the vat or tank. By this operation all the starch-granules are opened and a fine mash is produced. This mashing process can be carried on in wooden vats of ordinary size and construction with steam heating-coils, and the opening of the air-pipe should be about an inch in diameter. The mass is skimmed, and is then ready to be boiled with the acid.

For every hundred pounds (100 lbs.) of mash I take two hundred pounds (200 lbs.) of water, and heat the water in a closed tank to 212° Fahrenheit, which tank is provided with a heating steam-coil and with an agitator, and is connected to the air-pump or blower. To the water is then added the sulphuric acid, which, for the purpose of producing a sirup not intended to be crystallized, is in the proportion of one pound (1 lb.) to every hundred pounds (100 lbs.) of mash. The sulphuric acid, diluted in four times its quantity of water, is added in a small stream to the hot water. A small but continuous current or stream of air is then turned on, the stirrers are started, and the mash is added in small quantities till the amount desired has thus been put into the tank.

With a tank of fifteen hundred gallons (1,500 gals.) capacity, in which a thousand gallons (1,000 gals.) of liquid can be worked, the mash should all be added within an hour and a half. While the mash is being added the liquid is kept constantly at the boiling-point, and is continually agitated and supplied with air, the small quantities of mash put in each time permitting the temperature to be kept up to the point which will produce the quickest conversion of the mash.

After the mash has been added the liquid is boiled for about three (3) hours more, it being agitated all the time, and the stream of air being constantly introduced into the center of the mass at its bottom. When, by testing, it is ascertained that the starch has been converted into sugar, the heating-steam is shut off from the tank, but the agitation and supply of air are continued. The acid is then neutralized by adding to the liquid finely-powdered carbonized lime, using about one and one-fourth pound (1¼ lb.) of lime to every pound of sulphuric acid in the liquid. The lime is added in small quantities, (say a handful at a time,) and the last two pounds (2 lbs.) of lime may be mixed with warm water and added to the liquid in a milky state, the agitation and air-supply being continued throughout this operation. The liquid is then tested for acid, and if none is found this step of the process is completed. The tank in which this operation is performed can be made of hard wood with a cover, and provided with an agitator and a copper steam-coil, in the usual manner. The tank can be connected with the air-pump or blower by a lead pipe having an opening one-half of an inch large. The boiling being completed, the contents of the tank are allowed to settle for twenty-four (24) hours, when the liquor is drawn off through a woolen cloth. What sediment remains in the tank is washed thoroughly, and this sugar-holding water may be used when the next lot of mash is boiled with acid. The final settlings can be dried and used for food or fuel. The liquor first drawn off is then boiled in copper evaporators with large heating-surfaces and connected with the air-pump or blower down to about 25° Baumé, a small current of air being admitted all the time. To the liquor is then added the usual quantity of bone-black, and it is then boiled down to about 30° Baumé. After this the liquor is allowed to cool to about 145° Fahrenheit, which can be quickly accomplished by the continuous supply of air, and there is then added to it, for every one hundred gallons (100 gals.) of liquid, two gallons (2 gals.) of fresh blood diluted in two gallons (2 gals.) of water. The liquor is then slowly heated up to the boiling-point and retained at that temperature for about ten (10) minutes. The air-current is then stopped and the black scum removed from the surface of the liquor, which is then drawn off into a tank for settlement, preferably through a woolen cloth. This settling-tank should be quite high and have several faucets, so that as the small bodies of lime sink slowly to the bottom the now perfectly white, (water-white,) clear, and transparent substance can be drawn off at intervals for the final boiling.

The final boiling of the mass down to the required consistency is done, in the usual way, in a vacuum-pan, and the sirup is then passed over a cooler and conducted to the receiving-tank, or is subjected to the well-known manipulations for making sugar.

To prepare a sirup especially for crystallizing into sugar I change the process slightly from that described. Four pounds (4 lbs.) of sulphuric acid (instead of one pound) are added for every hundred pounds (100 lbs.) of mash. After the mash is introduced into the boiling water and acid the whole mass is boiled for about five (5) hours, instead of three (3) hours, and the current of air is doubled during this boiling process. The liquor is then treated as before described until the final boiling, when the liquor should be boiled down to 45° Baumé. After being cooled the mass is agitated, and the result is a fine, white, and dry crystalline sugar.

The continuous air-current used by me hastens the mashing of the flour and makes the disintegration of the starch-granules more complete and thorough. It quickens the conversion of the starch into sugar in the process of boiling and assists the neutralization of the acid. It increases the facility with which the liquor can be cooled during the manipulations. It prevents through all the operations the coloring or burning of the liquor, and materially assists to make a purer and sweeter sirup, and one which can be crystallized into a dry sugar. If the mass is sufficiently light, the air-current alone will serve to agitate the same, and the stirrers can be dispensed with.

My process of introducing a continuous stream of atmospheric air into the liquor during the different steps of manufacturing glucose could also be utilized in the manufacture of malt liquors (beer and ale) made from cereals or starch-containing substances during the analogous operations of mashing, fermenting, and boiling, and the result would be a finer and lighter-colored product than heretofore.

I am thus enabled to obtain a glucose which is white, or nearly white, of great specific gravity, and of a pure sweet taste, the yield from a given amount of material being increased.

What I claim is—

As an improvement in the manufacture of glucose, the process of obtaining a white, or nearly white, product of great specific gravity, the yield from a given amount of material being increased, as set forth, which consists in forcing currents of atmospheric air through or into the mass of material during the process of manufacture, substantially as described.

JOHN FERDINAND WOLFF.

Witnesses:
RICHD. N. DYER,
OLIVER W. MARBLE.